(12) United States Patent
You

(10) Patent No.: US 6,866,053 B2
(45) Date of Patent: Mar. 15, 2005

(54) BEACH UMBRELLA HAVING TELESCOPIC SHANK

(76) Inventor: Ching-Chuan You, P.O. Box 1-79, Taipei (TW), 100

( * ) Notice: Subject to any disclaimer, the term of this patent is extended or adjusted under 35 U.S.C. 154(b) by 57 days.

(21) Appl. No.: 10/436,113

(22) Filed: May 13, 2003

(65) Prior Publication Data

US 2004/0226591 A1 Nov. 18, 2004

(51) Int. Cl.$^7$ ............................................... A45B 19/00
(52) U.S. Cl. .................. 135/25.1; 248/188.5; 135/15.1
(58) Field of Search ............................. 135/25.1, 15.1, 135/20.3, 42, 44, 98, 99, 140, 141; 248/125.8, 188.5, 326, 333; 403/142, DIG. 12, 98, 97

(56) References Cited

U.S. PATENT DOCUMENTS

| | | | | |
|---|---|---|---|---|
| 5,186,197 A | * | 2/1993 | Lavine | 135/25.4 |
| 5,287,869 A | * | 2/1994 | Wu | 135/25.1 |
| 5,387,048 A | * | 2/1995 | Kuo | 403/109.3 |
| 5,593,239 A | * | 1/1997 | Sallee | 403/109.3 |
| 6,260,488 B1 | * | 7/2001 | Yang et al. | 108/107 |
| 6,418,949 B1 | * | 7/2002 | Lin et al. | 135/25.1 |
| 2002/0030146 A1 | * | 3/2002 | Akaike | 248/157 |

* cited by examiner

*Primary Examiner*—Anita King
*Assistant Examiner*—Amy J. Sterling

(57) ABSTRACT

A telescopic shank of beach umbrella invention for facilitating height adjustment and storage is provided. In one embodiment, the shank comprises an upper support tube and a lower sliding tube comprising a top fastening mechanism the fastening mechanism including an eccentric, intermediate shaft, an eccentric groove around the shaft, and a stop on the eccentric groove, and an eccentric C-shaped locking device put on the eccentric groove, the locking device including a stop block. In a sliding position, the stop and the stop block are opposite. Responsive to further rotating the sliding tube, the fastening mechanism, and the shaft about half circle about the support tube, the stop is urged against the stop block and an eccentric portion of the shaft and the stop urge against the locking device for biasing one side of the locking device against an inner wall of the support tube in a locked position.

10 Claims, 12 Drawing Sheets

BEACH UMBRELLA HAVING TELESCOPIC SHANK

BACKGROUND OF THE INVENTION

1. Field of the Invention

The present invention relates to beach umbrellas and more particularly to an improved beach umbrella having a telescopic shank.

2. Description of Related Art

A conventional beach umbrella is shown in FIG. 16. The umbrella has a large canopy for protection against the sun's rays. As shown, the umbrella comprises a large, metal rod as a shank having a tapered bottom end for ease of inserting into sand. For increasing portability, the shank is made into two separate, connectable pieces (e.g., upper shank R1 having a smaller diameter and lower shank R2 having a larger diameter). In use, simply insert a lower end of the upper shank R1 into a top end of the lower shank R2 prior to turning a lock lever B to fasten them together.

However, the prior art suffered from several disadvantages. For example, the two-piece design tends to cause one or two of them get lost. In detail, a user may forget the exact location of the previously detached upper and lower shanks after a period of time of unused. Thus, a reassembly of the beach umbrella is made impossible when a need for use arises. Also, an adjustment of the shank is impossible due to a fixed length thereof. Thus, it cannot satisfy various length needs of shank desired by users. Moreover, the large shank is not adapted to be used in a small, telescopic umbrella.

As to well known small umbrellas, its shank is made telescopic and has a diameter about 8 to 12 mm and a tube thickness about 0.5 to 0.8 mm. Hence, the shank of the small umbrella is substantially easy to manufacture in a rolling process. To the contrary, the shank of the beach umbrella has a diameter more than 20 mm, a tube thickness more than 1 mm, and a length more than 1.5 m. To the worse, there is little research and development about the improvement of the manufacturing process and associated manufacturing equipment of such beach umbrella due to a very small market. In addition, for protecting a person under the beach umbrella from lightning, the shank of the beach umbrella is typically made of insulated glass fiber as a rod. Hence, the beach umbrella is not adapted to be used in a small, telescopic umbrella. That is why the shank of the typical beach umbrella is made of two pieces. Hence, a need for improvement exists.

SUMMARY OF THE INVENTION

It is an object of the present invention to provide a beach umbrella having a telescopic shank so as to permit a user to adjust a desired length of the shank.

It is another object of the present invention to provide a beach umbrella having a telescopic shank comprising a support tube of fixed length and a connected sliding tube in which a larger portion of the sliding tube is capable of inserting into the support tube for saving storage space. Further, the sliding tube is prevented from disengaging out of the support tube. Thus, a problem of forgetting the exact location of the previously detached upper and lower shanks after a period of time of unused as experienced in the prior art is eliminated.

The above and other objects, features and advantages of the present invention will become apparent from the following detailed description taken with the accompanying drawings.

DETAILED DESCRIPTION OF THE PREFERRED EMBODIMENTS

Figure 1:
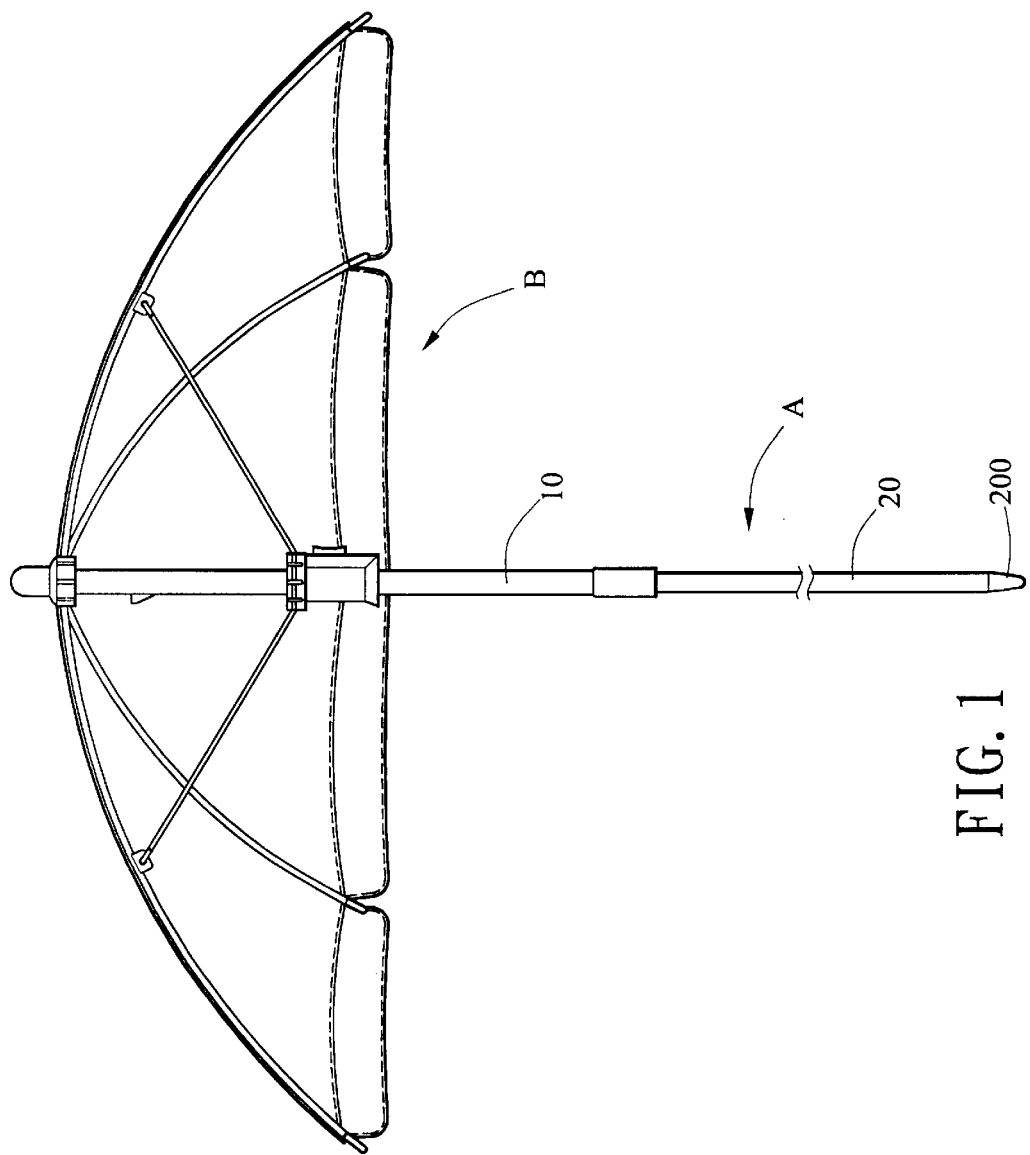
FIG. 1 is a plan view of a first preferred embodiment of beach umbrella having a telescopic shank according to the invention where both sliding tube and canopy are fully extended.
Figure 2:
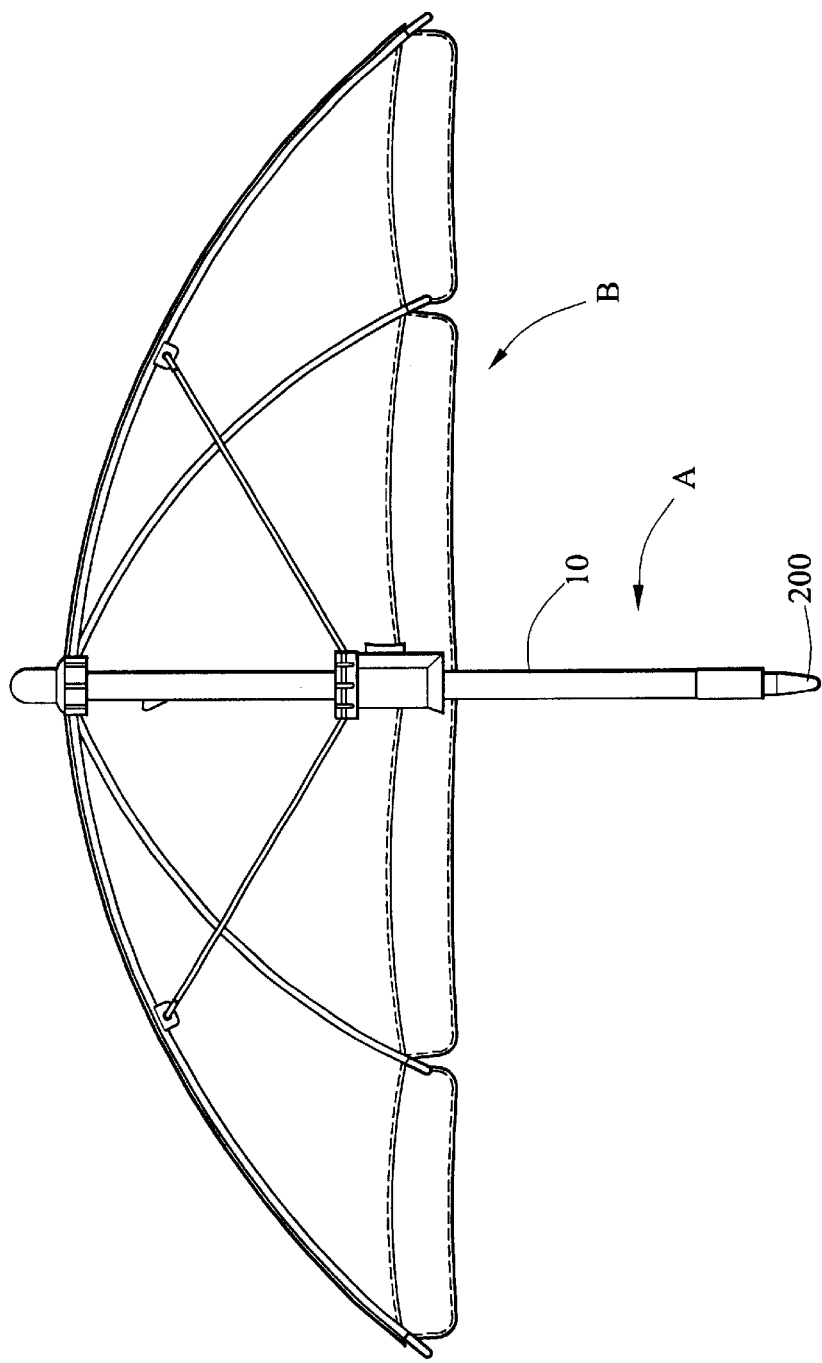
FIG. 2 is a plan view similar to FIG. 1 where the sliding tube is fully retracted.
Figure 3:
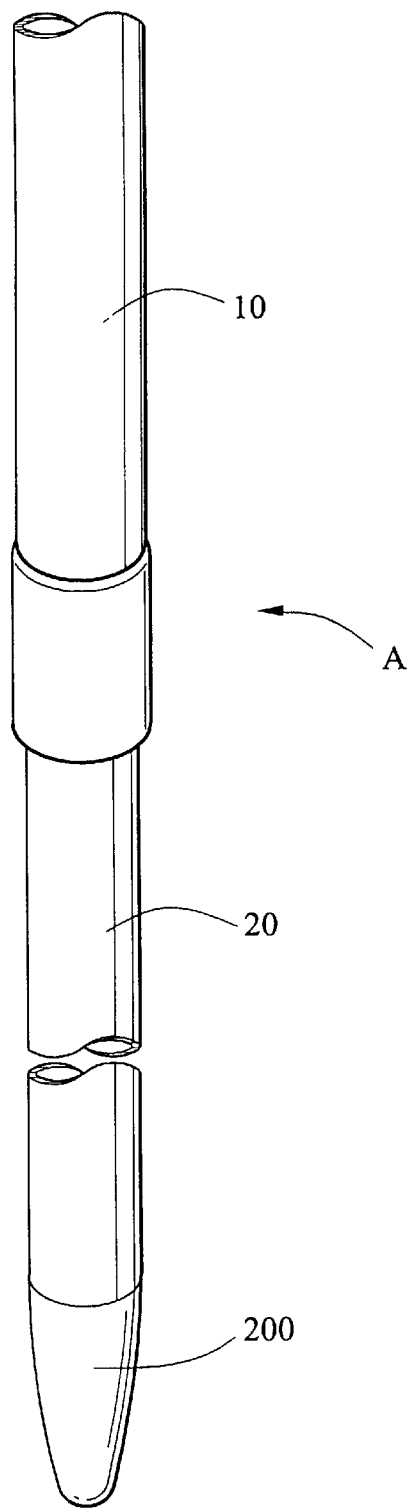
FIG. 3 is a perspective view of a portion of the shank including a support tube and a sliding tube.
Figure 4:
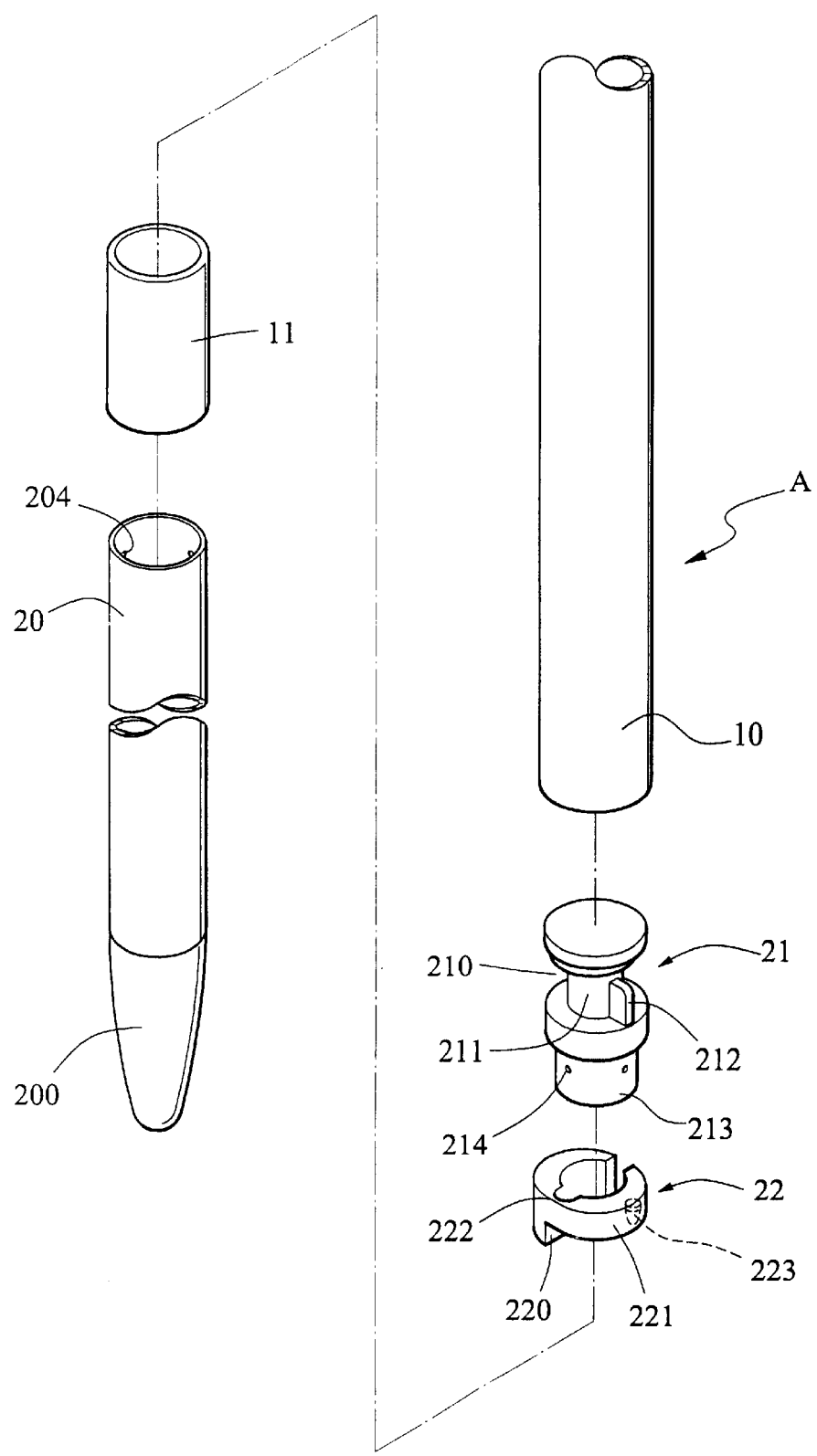
FIG. 4 is an exploded perspective view of the shank shown in FIG. 3.
Figures 5, 6:
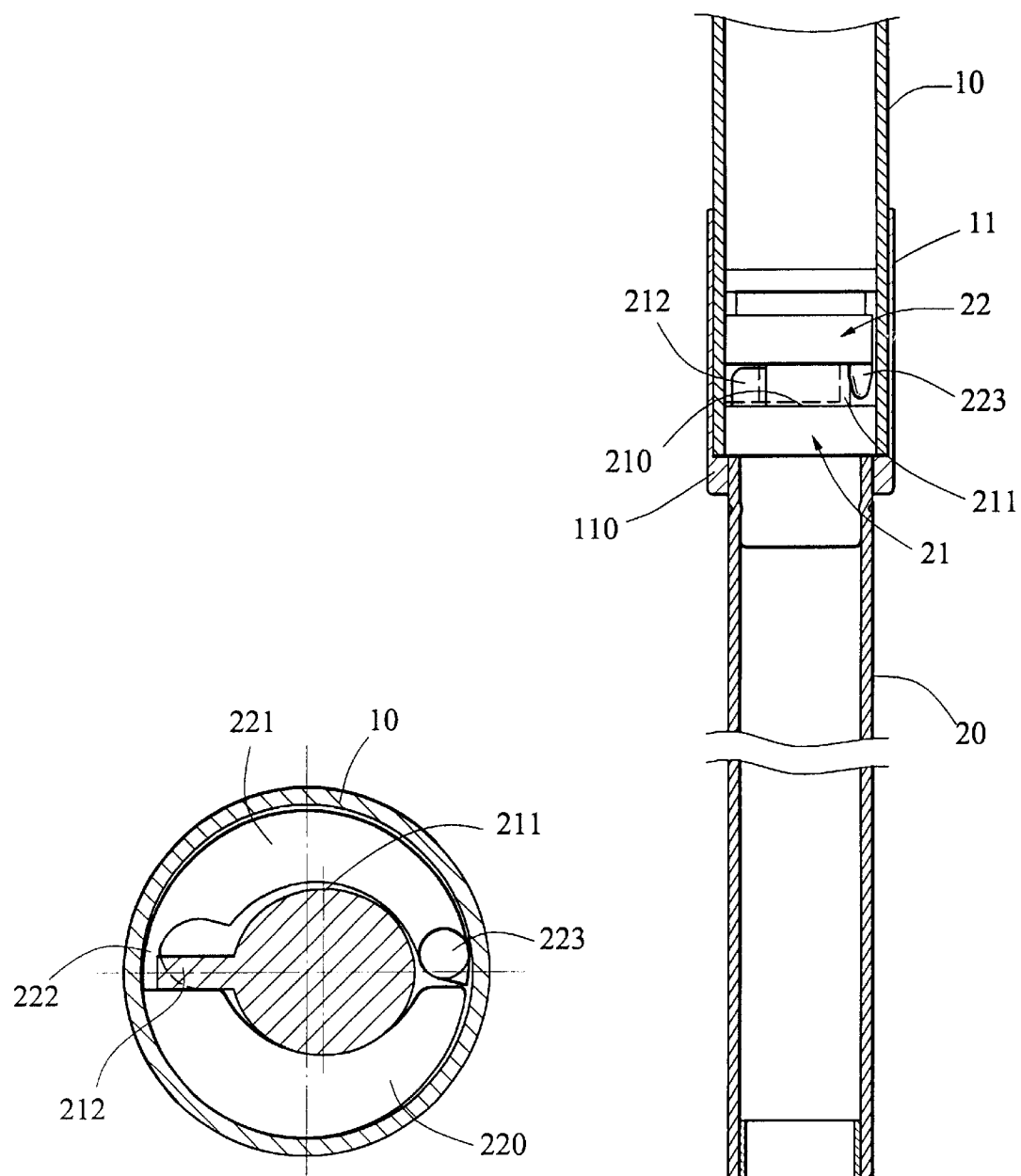
FIG. 5 is a cross-sectional view of a joint portion of the support tube and the sliding tube of FIG. 3 where the sliding tube is free to slide.
FIG. 6 is a cross-sectional view of the shank shown in FIG. 2.

Referring to FIGS. 1 to 9, there is shown a beach umbrella constructed in accordance with a first preferred embodiment of the invention. The umbrella comprises a canopy (B) and a telescopic shank (A) so that a user is permitted to adjust height of the shank (A) and thus the umbrella. The shank (A) comprises an upper support tube 10 and a lower sliding tube 20. The support tube 10 is coupled to umbrella frame for supporting the canopy B in an opened position. The support tube 10 comprises a bottom ring 11 including an inwardly extending rim 110 (see FIG. 6) having a diameter smaller than an outer diameter of an upper portion of the sliding tube 20 (see FIG. 8). When the sliding tube 20 is fully extended, the upper portion of the sliding tube 20 is urged against the inwardly extending rim 110 of the ring 11 so as to prevent the sliding tube 20 from being removed completely from the support tube 10.

The sliding tube 20, as shown in FIGS. 4–8, comprises a tapered bottom end 200. The sliding tube 20 is slidingly receivable in the support tube 10. A top of the sliding tube 20 is formed as a fastening mechanism 21 having a diameter slightly smaller than an inner diameter of the support tube 10. The fastening mechanism 21, as particularly shown in FIG. 4, comprises a lower cylinder 213 having a plurality of dents 214 therearound engaged with a plurality of equally spaced apart projections 204 on an upper portion of an inner wall of the sliding tube 20 so as to fix the fastening mechanism 21 in the top of the sliding tube 20. The fastening mechanism 21 comprises an intermediate, eccentric groove 210 around a shaft 211 being eccentric with respect to the sliding tube 20 and a stop 212 projected on the eccentric groove 210. The sliding tube 20 further comprises a C-shaped locking device 22 put on the eccentric groove 210. The C-shaped locking device 22 has an outer diameter smaller than that of the fastening mechanism 21. The C-shaped locking device 22 is eccentric and comprises an eccentric arc section 220 of thicker wall, an eccentric arc section 221 of thinner wall, a resilient connecting section 222 interconnected the eccentric arc section 220 of thicker wall and the eccentric arc section 221 of thinner wall, and a stop block 223 in the eccentric arc section 221 of thinner wall.

In use, the tapered bottom end 200 of the sliding tube 20 is inserted into sand or earth. Next, counterclockwise rotate the sliding tube 20 so as to adjust a relative position thereof with respect to the support tube 10. In one position after rotation, the stop 212 of the fastening mechanism 21 and the stop block 223 of the C-shaped locking device 22 are opposite (see FIG. 5). In this position, the fastening mechanism 21 of the sliding tube 20 is not biased and interfered by an inner wall of the support tube 10. Hence, the sliding tube 20 is free to slide in the support tube 10 so as to adjust height of the umbrella (see FIG. 6).

Figures 7, 8:
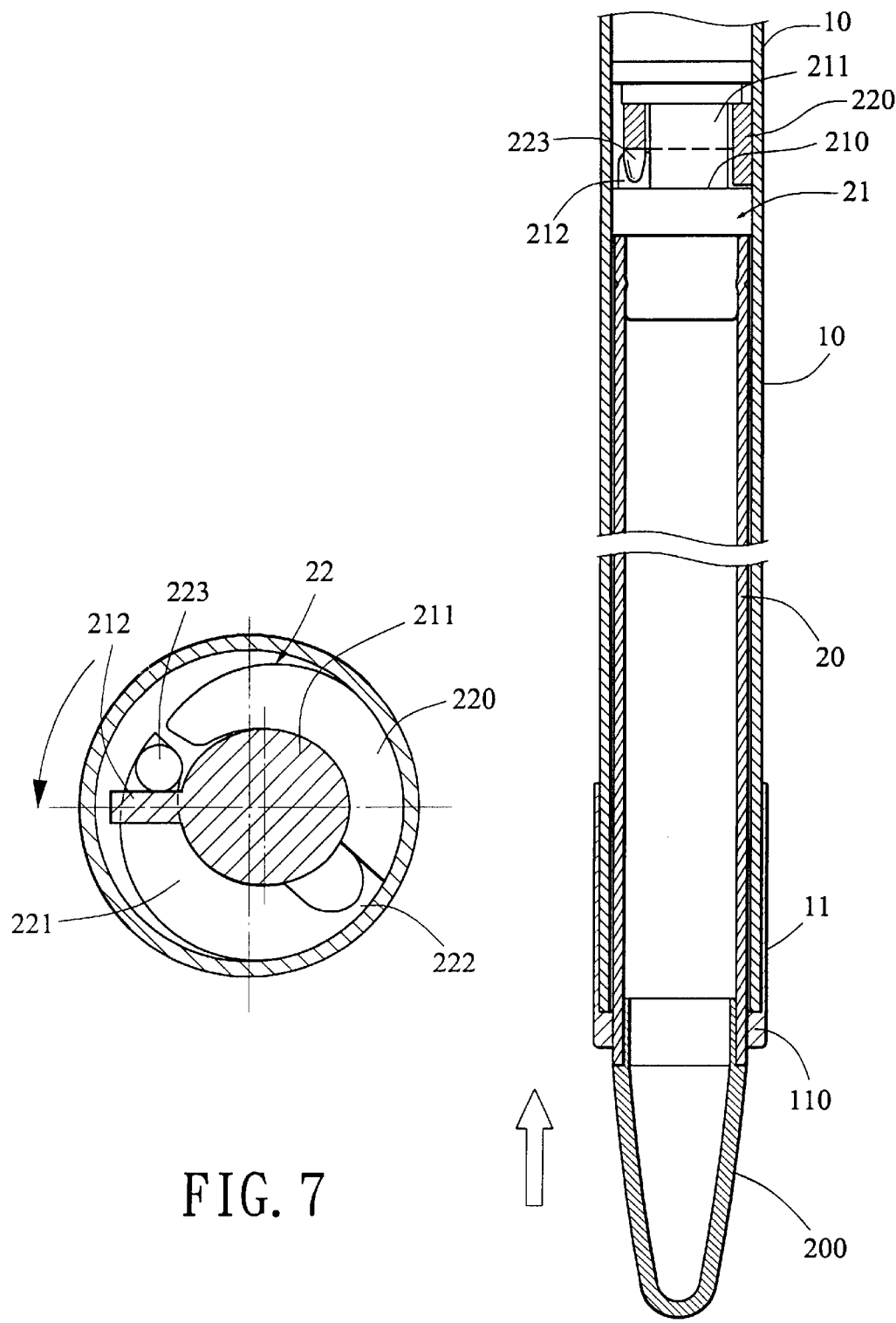
FIG. 7 is a view similar to FIG. 5 where the sliding tube is in a locked position.
FIG. 8 is a cross-sectional view of the shank shown in FIG. 3 where the sliding tube is locked.
Figure 9:
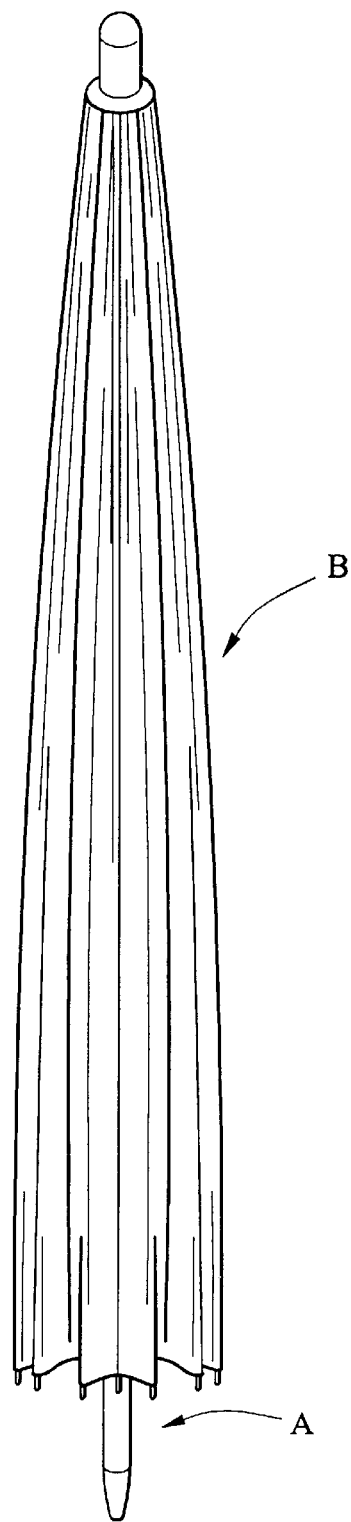
FIG. 9 is a perspective view of the fully folded umbrella canopy.
Figure 10:
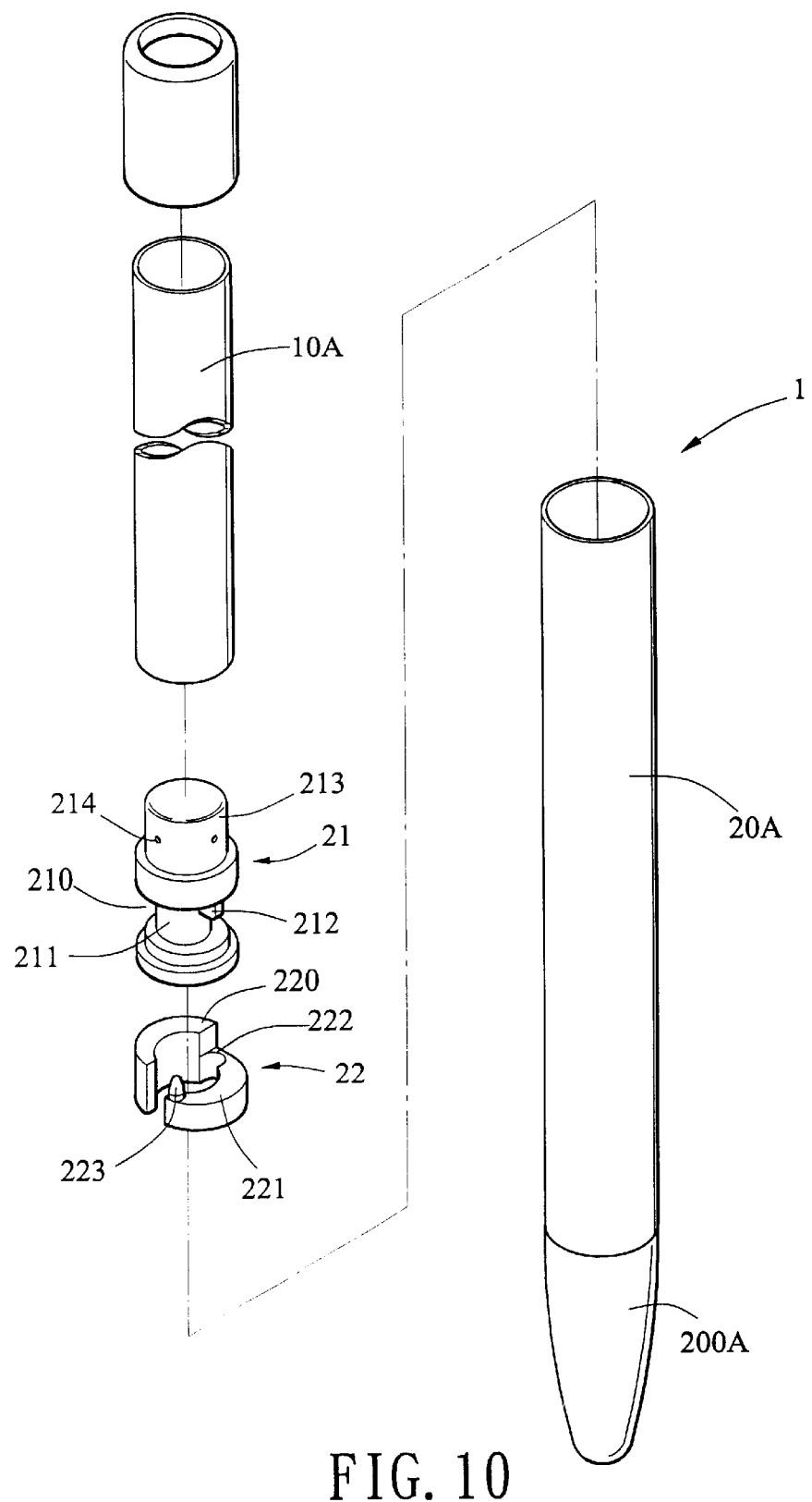
FIG. 10 is an exploded perspective view of a telescopic shank of beach umbrella according to a second preferred embodiment of the invention.
Figure 11:
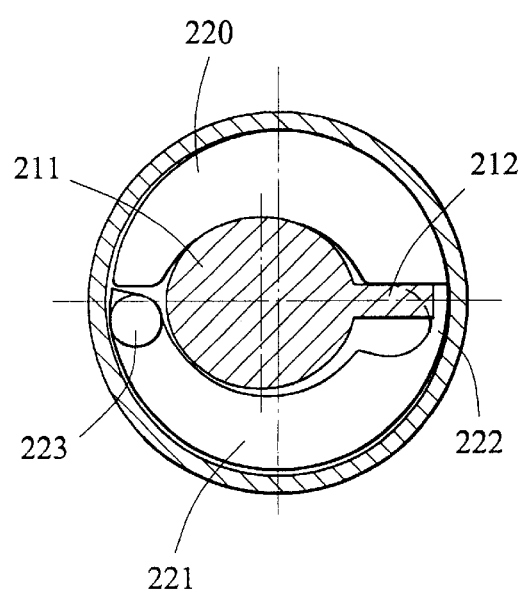
FIG. 11 is a cross-sectional view of a joint portion of the support tube and the sliding tube of FIG. 10 where the sliding tube is free to slide.
Figure 12:
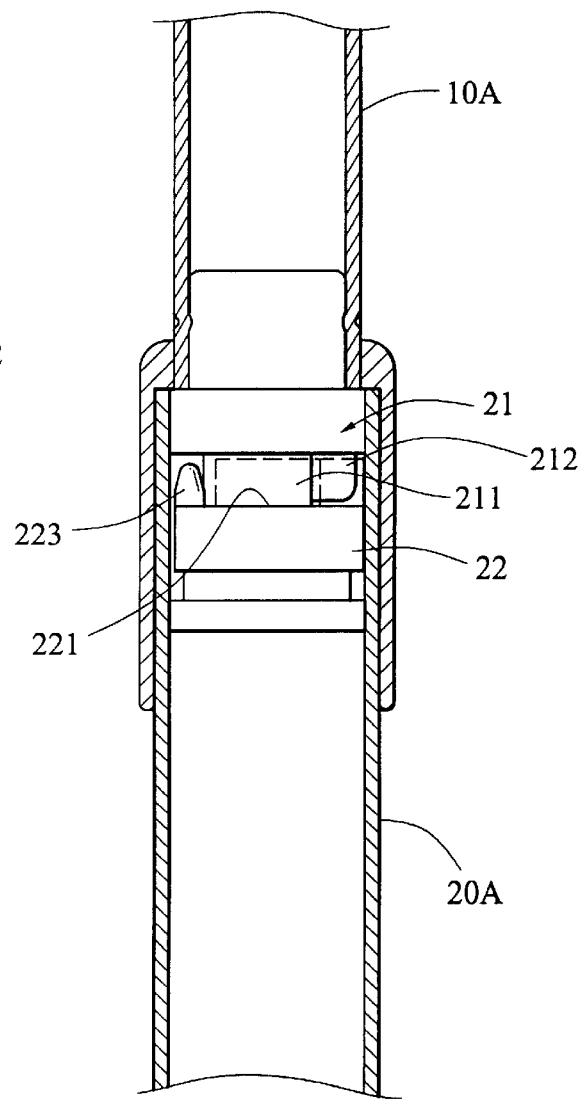
FIG. 12 is another cross-sectional view of the joint portion, the support tube, and the sliding tube where the sliding tube is free to slide.
Figure 13:
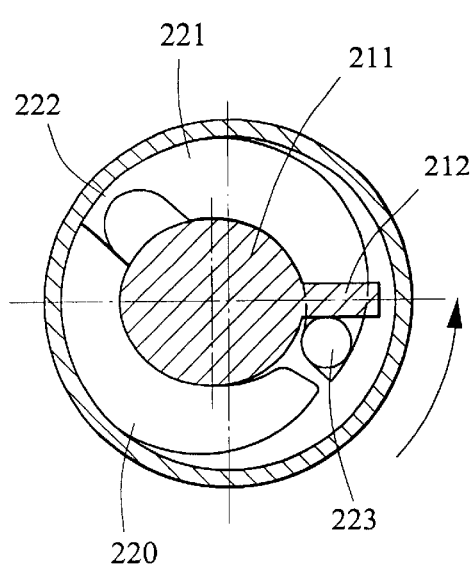
FIG. 13 is a view similar to FIG. 11 where the sliding tube is in a locked position.
Figure 14:
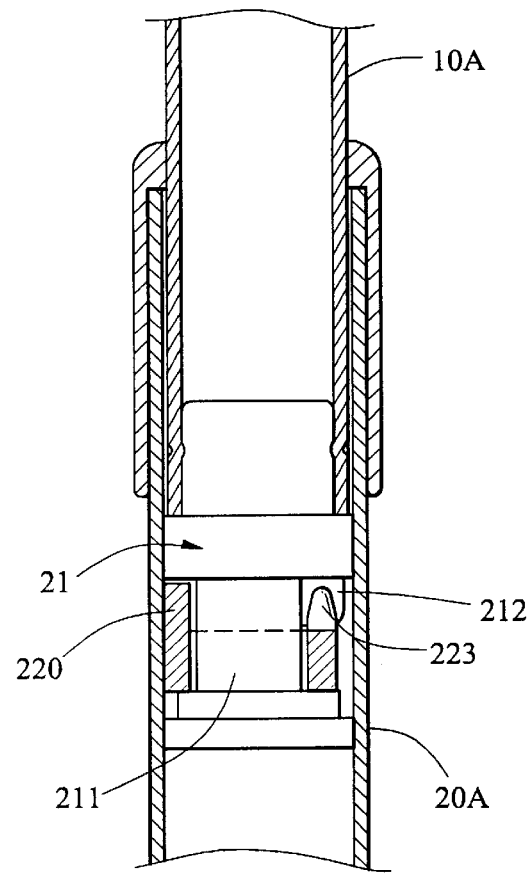
FIG. 14 is a view similar to FIG. 12 where the sliding tube is locked.
Figure 15:
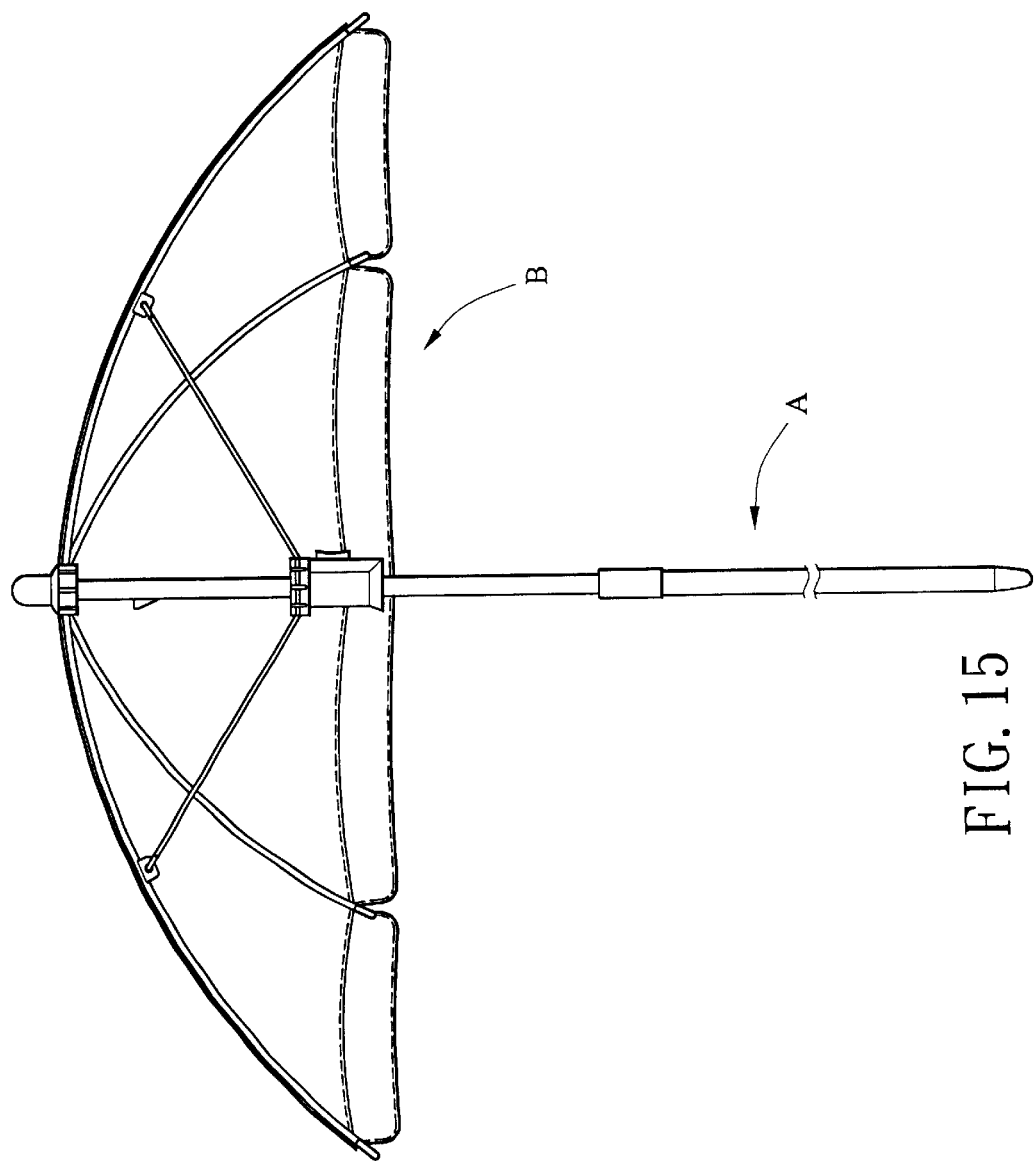
FIG. 15 is a side plan view of the fully extended beach umbrella according to the second preferred embodiment of the invention.
Figure 16:
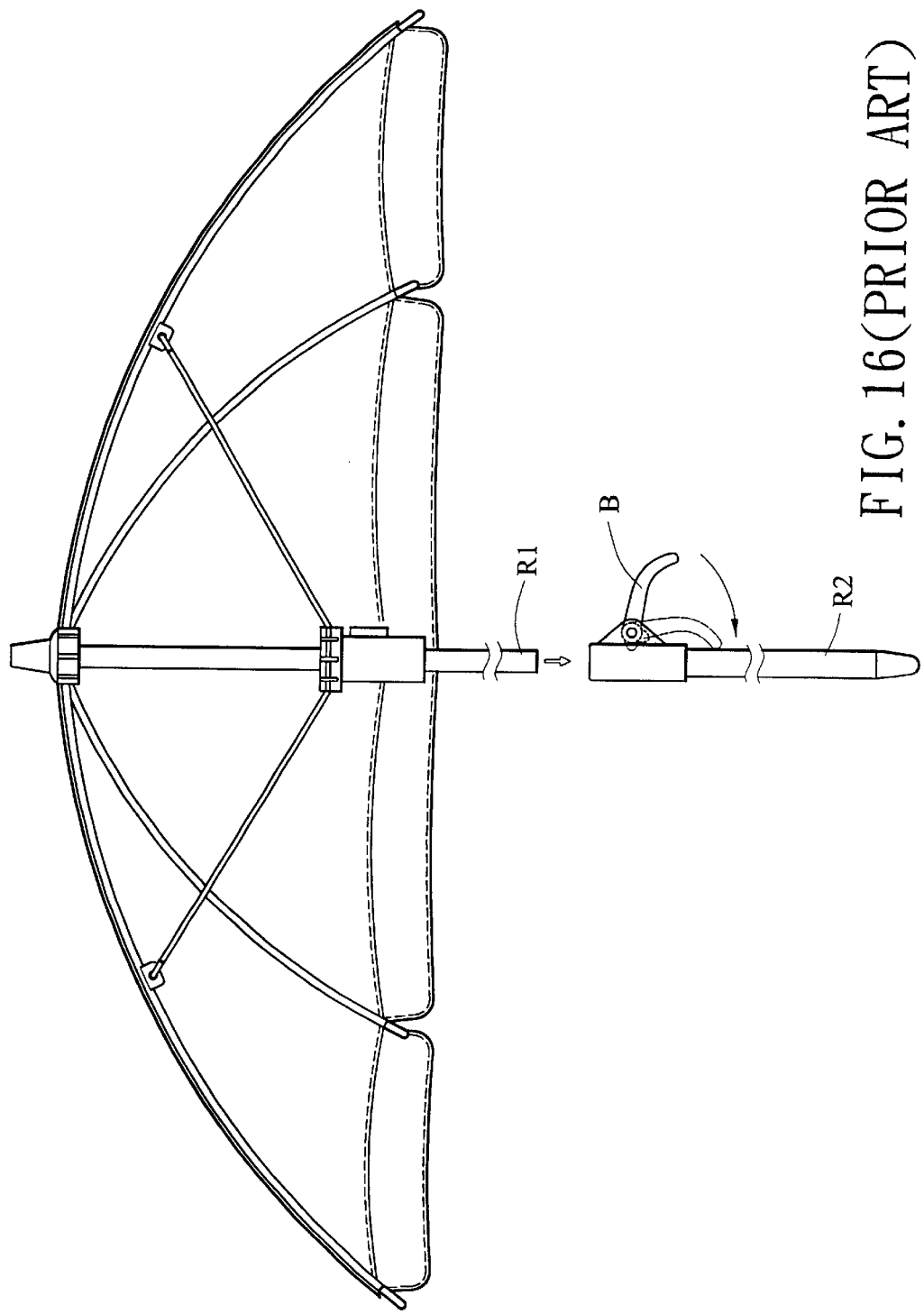
FIG. 16 is a side plan view of a conventional beach umbrella.

After a desired height of the umbrella has been adjusted, a user can rotate clockwise the sliding tube 20, the fastening mechanism 21, and the eccentric shaft 211 about half circle until the stop 212 of the fastening mechanism 21 is urged against the stop block 223 of the C-shaped locking device 22 with the connecting section 222 being elastically deformed (see FIG. 7). Also, both the eccentric portion of the eccentric shaft 211 and the stop 212 urge against the C-shaped locking device 22 for biasing one side of the C-shaped locking device 22 against the inner wall of the support tube 10. As a result, the sliding tube 20 is immovable about the support tube 10 due to a biasing of the eccentric shaft 211 of the fastening mechanism 21 against the C-shaped locking device 22 (see FIGS. 7 and 8). At this position, the purpose of adjusting height of the shank B and thus height of the beach umbrella is achieved.

As to retract the shank (A) and fold the canopy (B), a user can rotate the support tube 10 for unfastening the fastening mechanism 21 and the C-shaped locking device 22 therein. As a result, the sliding tube 20 is slidable about the support tube 10. Next, slide the sliding tube 20 into the support tube 10 to the limit. At this position, both the height of the shank (B) and thus the height of the beach umbrella are minimum. Finally, fold the canopy (B) in a closed position, thus finishing the retraction of the beach umbrella (see FIG. 9). Note that a large portion of the sliding tube 20 is retracted in the support tube 10 in an unused position. Hence, the sliding tube 20 is prevented from disengaging out of the support tube 10. Thus, a problem of forgetting the exact location of the previously detached upper and lower shanks after a period of time of unused as experienced in the prior art is eliminated. As to use the umbrella, a user can rotate counterclockwise the support tube 10 for unfastening prior to pulling the sliding tube 20 a desired distance out of the support tube 10.

Referring to FIGS. 10 to 15, there is shown a beach umbrella having A telescopic shank constructed in accordance with a second preferred embodiment of the invention. The second preferred embodiment substantially has same construction as the first preferred embodiment. The differences between the first and the second preferred embodiments, i.e., the characteristics of the second preferred embodiment are detailed below. The support tube 20A is disposed at a lower position, the sliding tube 10A is disposed at an upper position, and the fastening mechanism 21 is formed at a bottom of the sliding tube 10A as contrary to the first preferred embodiment.

In brief, the invention can provide a virtually limitless number of extension positions of the sliding tube with respect to the support tube (i.e., height adjustment of the shank and thus the umbrella) by incorporating the fastening mechanism, the C-shaped locking device, and other associated components as well as space saving storage.

While the invention herein disclosed has been described by means of specific embodiments, numerous modifications and variations could be made thereto by those skilled in the art without departing from the scope and spirit of the invention set forth in the claims.

What is claimed is:

1. A telescopic shank of a beach umbrella having a canopy supported by frame, the shank comprising:

an upper support tube coupled to the frame for supporting the canopy in an opened position; and a lower sliding tube having an outer diameter slightly smaller than an inner diameter of the support tube so as to be slidingly received in the support tube, the sliding tube including a top fastening mechanism having a diameter slightly smaller than the inner diameter of the support tube, the fastening mechanism including an intermediate shaft being eccentric with respect to the sliding tube, an eccentric groove around the shaft, and a stop projected on the eccentric groove, and an eccentric C-shaped locking means put on the eccentric groove, the C-shaped locking means including a stop block, wherein responsive to a first rotating the sliding tube with respect to the support tube, the stop of the fastening mechanism and the stop block of the C-shaped locking means are opposite in a sliding position, and responsive to a second rotating the sliding tube, the fastening mechanism, and the shaft about half circle with respect to the support tube, the stop of the fastening mechanism is urged against the stop block of the C-shaped locking means so as to have an eccentric portion of the shaft and the stop of the fastening mechanism to urge against the C-shaped locking means for biasing one side of the C-shaped locking means against an inner wall of the support tube in a locked position.

2. The telescopic shank of claim 1, wherein the C-shaped locking means further comprises an eccentric arc section of thicker wall, an eccentric arc section of thinner wall with the stop block disposed therein, and a resilient connecting section interconnected the eccentric arc section of thicker wall and the eccentric arc section of thinner wall.

3. The telescopic shank of claim 1, wherein the sliding tube further comprises a tapered bottom end.

4. The telescopic shank of claim 1, wherein the support tube comprises a bottom ring including an inwardly extending rim having a diameter smaller than an outer diameter of the fastening mechanism so that when the sliding tube is fully extended, a bottom of the fastening mechanism is urged against the inwardly extending rim for preventing the sliding tube from being removed completely from the support tube.

5. The telescopic shank of claim 1, wherein an outer diameter of the C-shaped locking means is smaller than that of the fastening mechanism.

6. A telescopic shank of a beach umbrella having a canopy supported by frame, the shank comprising:

a lower support tube; and an upper sliding tube coupled to the frame for supporting the canopy in an opened position, the sliding tube having an outer diameter slightly smaller than an inner diameter of the support tube so as to be slidingly received in the support tube, the sliding tube including a bottom fastening mechanism having a diameter slightly smaller than the inner diameter of the support tube, the fastening mechanism including an intermediate shaft being eccentric with respect to the sliding tube, an eccentric groove around the shaft, and a stop projected on the eccentric groove, and an eccentric C-shaped locking means put on the eccentric groove, the C-shaped locking means including a stop block, wherein responsive to a first rotating the sliding tube with respect to the support tube, the stop of the fastening mechanism and the stop block of the C-shaped locking means are opposite in a sliding position, and responsive to a second rotating the sliding tube, the fastening mechanism, and the shaft about half circle with respect to the support tube, the stop of the fastening mechanism is urged against the stop block of the C-shaped locking means so as to have an eccentric portion of the shaft and the stop of the fastening mechanism to urge against the C-shaped locking means for biasing one side of the C-shaped locking means against an inner wall of the support tube in a locked position.

7. The telescopic shank of claim 6, wherein the C-shaped locking means further comprises an eccentric arc section of thicker wall, an eccentric arc section of thinner wall with the stop block disposed therein, and a resilient connecting section interconnected the eccentric arc section of thicker wall and the eccentric arc section of thinner wall.

8. The telescopic shank of claim 6, wherein the sliding tube further comprises a tapered bottom end.

9. The telescopic shank of claim 6, wherein the support tube comprises a top ring including an inwardly extending rim having a diameter smaller than an outer diameter of the fastening mechanism so that when the sliding tube is fully extended, a top of the fastening mechanism is urged against the inwardly extending rim for preventing the sliding tube from being removed completely from the support tube.

10. The telescopic shank of claim 6, wherein an outer diameter of the C-shaped locking means is smaller than that of the fastening mechanism.

* * * * *